UNITED STATES PATENT OFFICE.

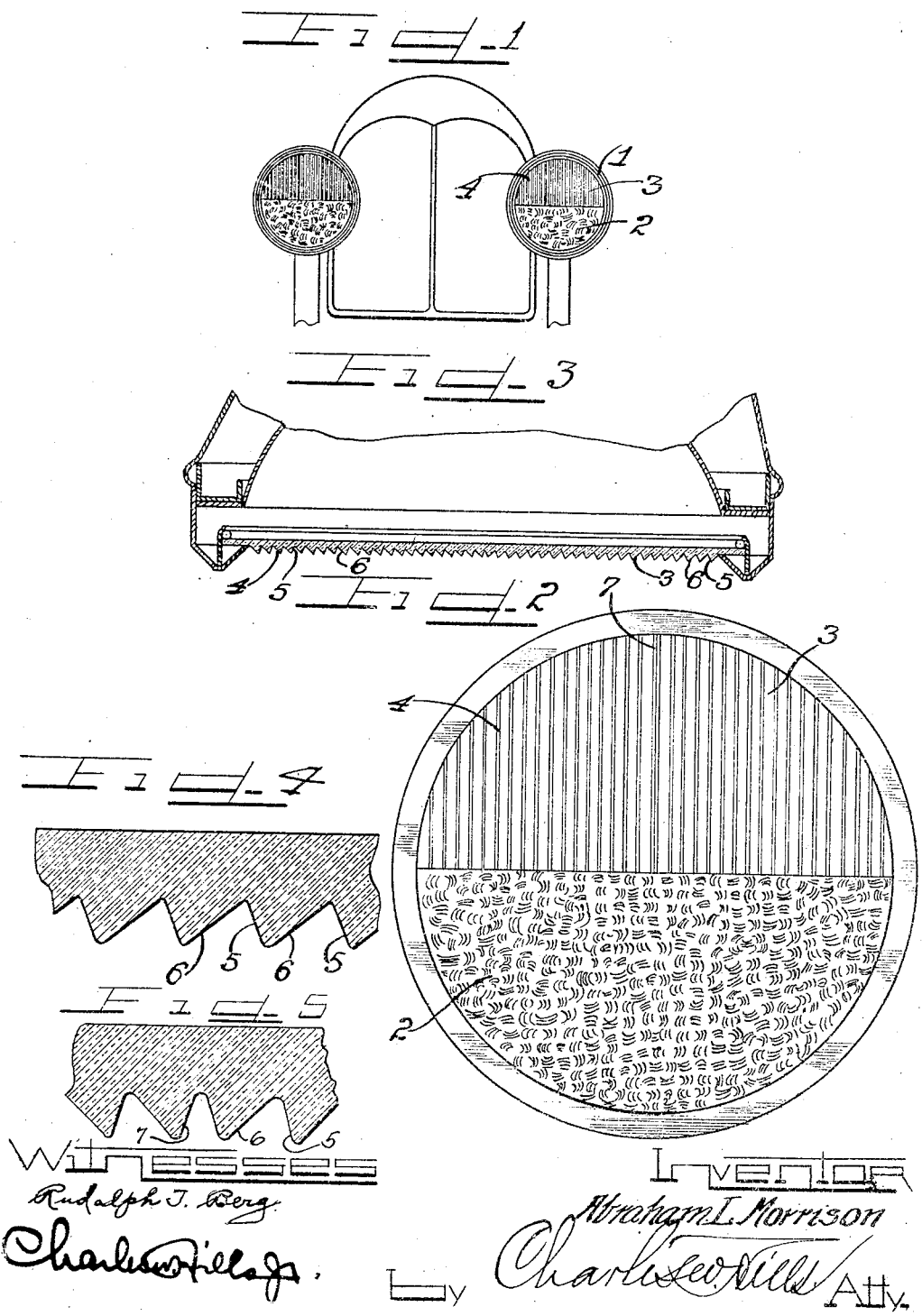

ABRAHAM L. MORRISON, OF DUBUQUE, IOWA.

LENS.

1,363,805.

Specification of Letters Patent.   Patented Dec. 28, 1920.

Application filed October 11, 1917. Serial No. 195,940.

*To all whom it may concern:*

Be it known that I, ABRAHAM L. MORRISON, a citizen of the United States, and a resident of the city of Dubuque, in the county of Dubuque and State of Iowa, have invented certain new and useful Improvements in Lenses; and I do hereby declare that the following is a full, clear, and exact description of the same, reference being had to the accompanying drawings, and to the numerals of reference marked thereon, which form a part of this specification.

It is an object of this invention to provide a glass for a headlight of an automobile in which the direct rays of the light are broken up and diffused in such a manner that the glare is taken from the headlight but which nevertheless projects a strong beam or spray of light in front of the automobile for a considerable distance, thoroughly lighting the road in advance of the car in an efficient manner.

It is also an object of this invention to provide a lens for a headlight in which the direct rays of the light are completely broken up and diffused in such a manner as to effect a strong glow light, which has a better efficiency than a plain glass and which has the further advantage of eliminating the glare.

It is further an object of this invention to provide a lens in which a novel prism or sets of prisms are used in combination with a chipped or frosted surface, which different elements or surfaces coact for accomplishing the desired results.

Other and further important objects of this invention will be apparent from the disclosures in the drawings and specification.

The invention (in a preferred form) is illustrated in the drawings and hereinafter more fully described.

On the drawings:

Figure 1 is a fragmentary front elevation of a car provided with lenses embodying my invention.

Fig. 2 is an enlarged front view of the lens.

Fig. 3 is a section taken through the corrugated or ribbed portion.

Fig. 4 is an enlarged fragmentary detail section taken through the ribbed portion.

Fig. 5 is an enlarged fragmentary detail section taken through the central ribs where the opposed right and left hand ribs come together.

As shown in the drawings:

The reference numeral 1, indicates the headlight to which the lens embodying my invention is attached. The lens comprises a glass having one half or a portion 2, thereof frosted or chipped and ribs 3—4, provided on the other half.

Said ribs as shown clearly in Figs. 3, 4 and 5, have an inner short angular wall or face 5, and an outer long angular surface 6, and the central ribs have slightly diverging walls 7, to emit a direct light therethrough.

The operation is readily seen. In the construction shown the light is diffused through the frosted part in a glow and the direct beams are broken up by the ribbed portion and are projected therethrough, which uniting with the diffused glow from the frosted part provide a soft light and at the same time a light that penetrates the darkness far in advance of the car.

I claim as my invention:

A lens for automobile headlights, comprising a circular pane of glass divided into two equal portions by a horizontal diameter, the portion below the diameter being frosted, and the portion above the diameter being composed of two equal opposed sets of vertical ribs provided with inner short angular faces and outer long angular faces whereby the rays of light passing through the outer long faces converge and cross at a predetermined distance from the lens, and the inner short faces internally reflect some of the rays which are then given a maximum lateral divergence by refraction through the outer long faces.

In testimony whereof I have hereunto subscribed my name in the presence of two subscribing witnesses.

ABRAHAM L. MORRISON.

Witnesses.
G. OWEN,
W. C. GIBSON.